United States Patent [19]

Hartman

[11] 4,428,554

[45] Jan. 31, 1984

[54] FREE-STANDING SUPPORT FOR A LAMP OR THE LIKE

[76] Inventor: Cedric Hartman, P.O. Box 3842, Omaha, Nebr. 68103

[21] Appl. No.: 242,331

[22] Filed: Mar. 10, 1981

[51] Int. Cl.³ .......................................... F16M 13/00
[52] U.S. Cl. ................................. 248/415; 248/417; 248/418; 362/413
[58] Field of Search ................. 248/125, 415, 280.1; 362/395, 413, 414, 418, 417, 412

[56] References Cited

U.S. PATENT DOCUMENTS

| | | | |
|---|---|---|---|
| 434,743 | 8/1890 | Trapp | 248/415 |
| 584,795 | 6/1897 | Schrader | 248/415 |
| 941,863 | 11/1909 | Erikson | 362/414 |
| 1,541,752 | 6/1925 | Sampson | 362/413 |
| 1,578,784 | 3/1926 | Walton | 248/417 |
| 1,636,211 | 7/1927 | Bramming | 362/413 X |
| 1,680,828 | 8/1928 | Walton | 248/417 |
| 1,970,624 | 8/1934 | Recker | 248/412 |
| 3,409,265 | 11/1968 | Wichers et al. | 248/415 |
| 3,834,660 | 9/1974 | Leffler | 248/418 |
| 4,034,214 | 7/1977 | Chapman et al. | 362/395 |

FOREIGN PATENT DOCUMENTS

| | | | |
|---|---|---|---|
| 133576 | 5/1933 | Austria | 362/413 |
| 452486 | 11/1948 | Canada | 248/280.1 |
| 576127 | 5/1933 | Fed. Rep. of Germany | 240/81 |
| 81956 | 10/1963 | France | 362/413 |

Primary Examiner—Ramon S. Britts
Assistant Examiner—Sarah A. Lechok

[57] ABSTRACT

A stable support comprising a free-standing base, a column extending upwardly from the base and located eccentrically with respect to the vertical axis of the base, a stem extending upwardly and laterally from the upper end of the column and across the central vertical axis of the base and carrying a lamp at the opposite side of the axis from the eccentric column. The column may be rotatable on the base. Means are provided for limiting that rotation and for adjusting the height of the lamp above the base.

14 Claims, 6 Drawing Figures

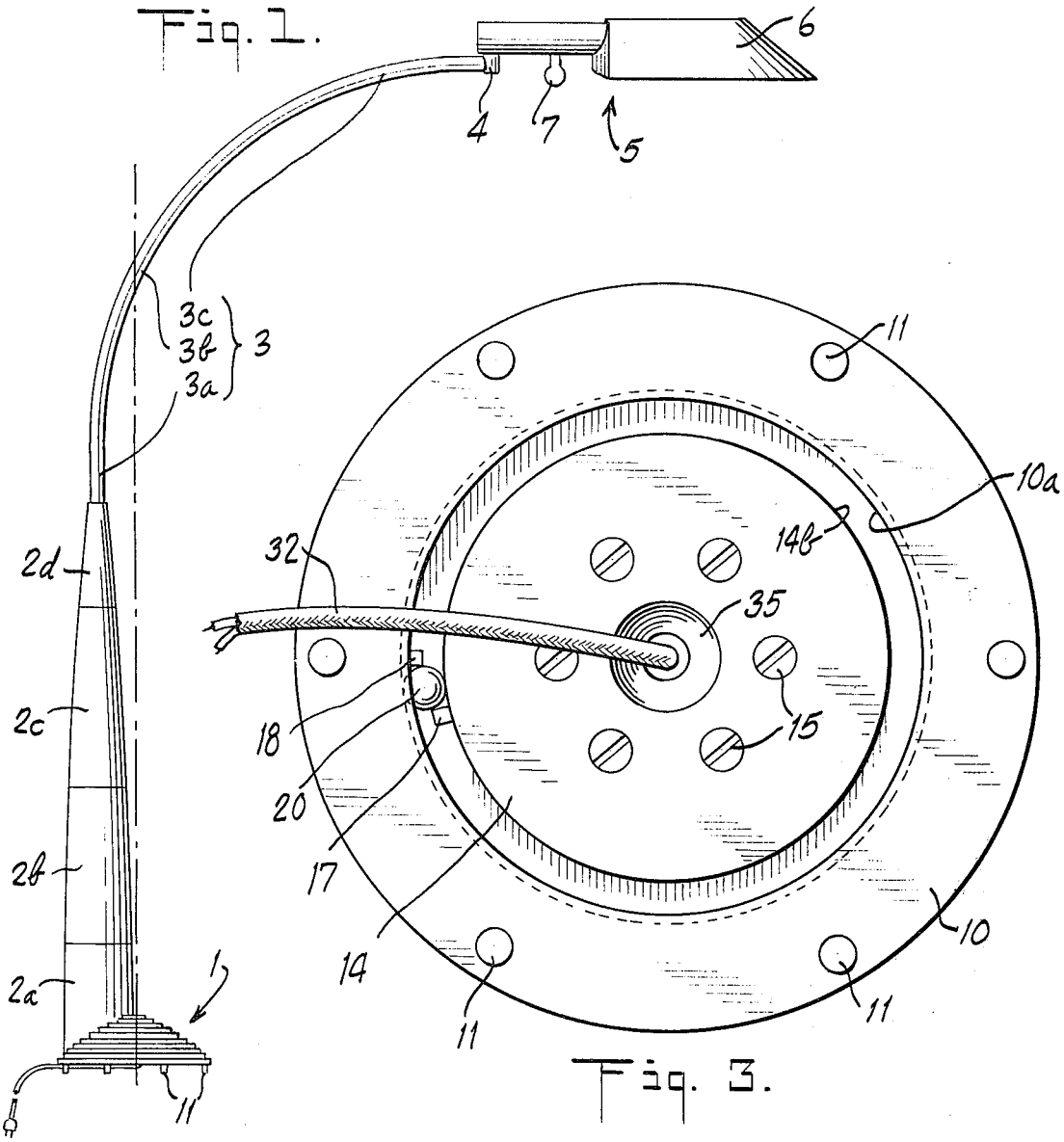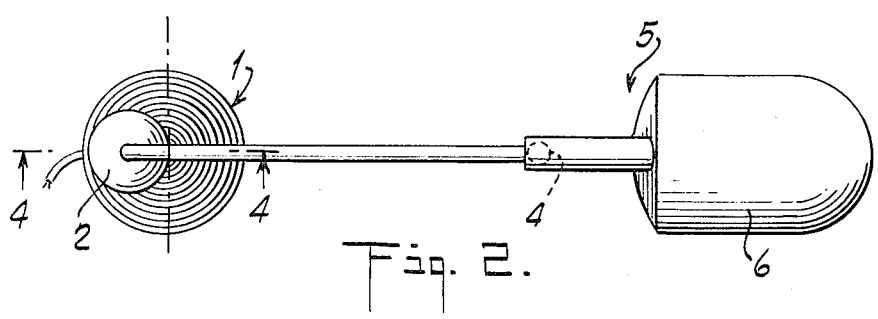

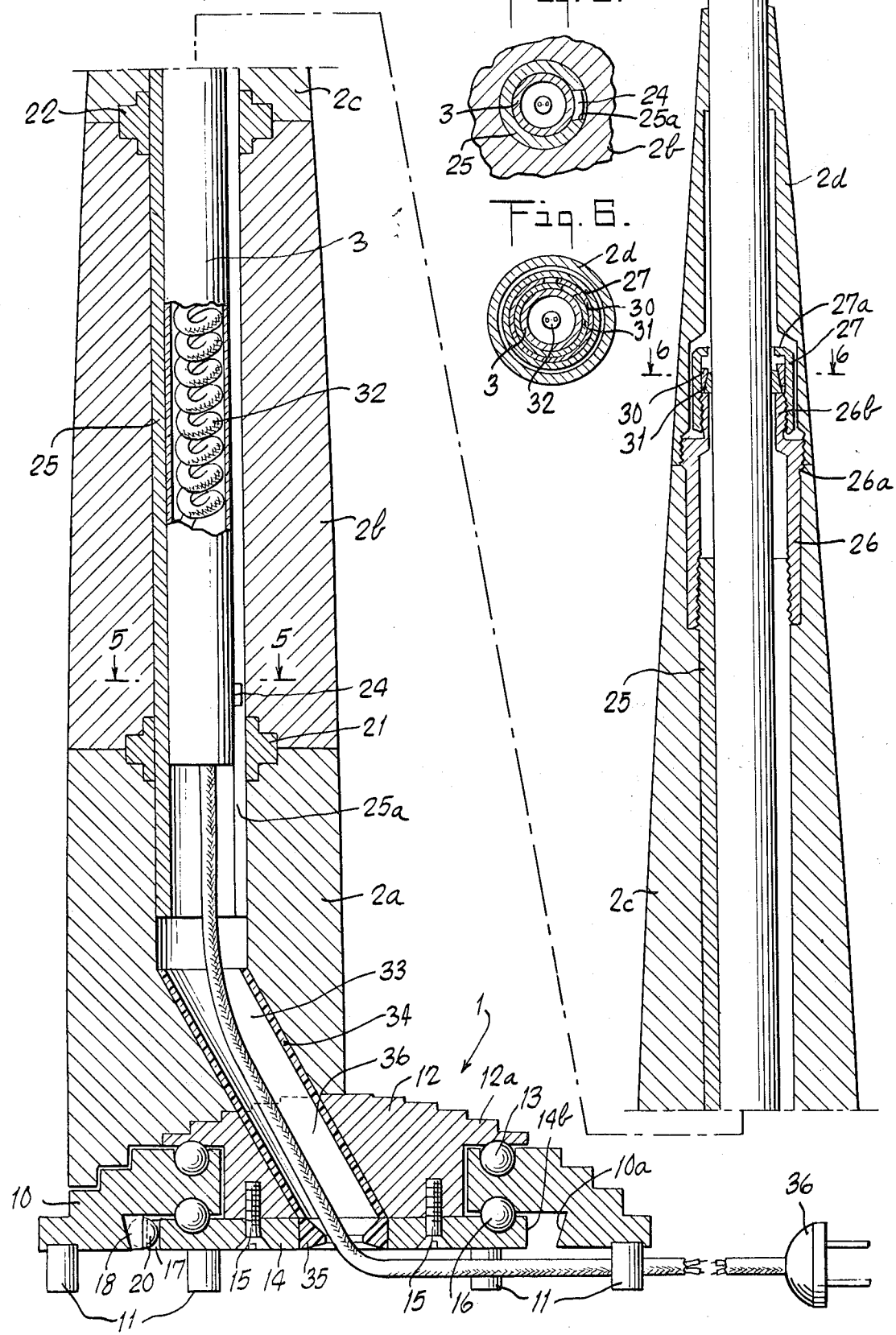

FREE-STANDING SUPPORT FOR A LAMP OR THE LIKE

BRIEF SUMMARY OF THE INVENTION

This lamp is free-standing and completely stable against tilting in any direction, even though it is supported on a relatively small diameter base. The support comprises a stationary base and a column rotatable on the base and eccentric with respect to a central vertical axis of the base. The upper end of the column carries a transversely extending arm, which extends through the central vertical axis and carries the lamp at its other end. The torque due to the lamp and the arm is balanced by the opposing torque due to the eccentric column, so that the lamp is stable. The base comprises an annulus and a disk rotatable in the annulus on two sets of ball bearings. Means are provided for limiting the rotation of the base to about 700° (less than two complete revolutions).

The stem of the lamp is adjustable vertically with respect to the column fixed on the base, so that the height of the lamp above the supporting surface may be adjusted. The adjusting mechanism is concealed so that it cannot be casually changed.

DRAWINGS

FIG. 1 is an elevational view of a lamp support constructed in accordance with the invention.

FIG. 2 is a plan view of the lamp and support of FIG. 1.

FIG. 3 is a bottom plan view of the support of FIG. 1, on an enlarged scale.

FIG. 4 is a fragmentary cross-sectional view of the lamp of FIG. 1, taken on the line 4—4 of FIG. 2, on the enlarged scale of FIG. 3.

FIG. 5 is a fragmentary cross-sectional view taken on the line 5—5 of FIG. 4.

FIG. 6 is a fragmentary cross-sectional view taken on the line 6—6 of FIG. 4.

DETAILED DESCRIPTION

A lamp generally indicated at 5 is supported on a base generally indicated at 1 by means of a column 2 projecting upwardly from the base and a stem 3 extending upwardly from the top of the column 2. The upper end of the stem 3 is curved laterally at 3b and carries at its outer end 3c a vertical axis pivot 4 on which is mounted the lamp 5 including a shade 6 and a switch 7.

The column 2 is located eccentrically with respect to the vertical axis of the base 1, and the stem 3 extends across that axis, so that the lamp 6 is located on one side of the axis and the column 2 on the opposite side. The torque due the mass of the lamp 6 and its associated parts, which acts clockwise about the center of the base 1, as viewed in FIG. 1, is substantially balanced by the torque due to the mass of the column 2, so that the lamp is stable. The circumference of the bottom of the column 2 is tangent to the vertical axis of base 1, so that the entire mass of the column 2 is located at one side of that axis. This stability is attained whether the lamp and pedestal are rotatable on the base 1 or not. However, it is preferred to make the lamp rotatable on the base and thus more conveniently usable, by the use of the construction described below.

The base 1 comprises an annulus 10 (see FIG. 4) supported by legs 11 on an underlying surface, which may be a floor or a table. A disk 12 having a flange 12a adjacent its upper end is supported on the annulus 10 by means of ball bearings 13. A bearing plate 14 is attached to the bottom of the disk 12 by any suitable means such as screws 15. Plate 14 extends outwardly beyond the disk 12 and forms a lower flange on the disk 12. Another set of ball bearings 16 is trapped between the plate 14 and the bottom of the annulus 10. The column 2 is fixed on the disk 12, as by welding. The circumference of the bottom of column 2 is tangent to the central vertical axis of the base 1. The outer part of the column 12 overlies part of the annulus 10 and is spaced therefrom with sufficient clearance to permit free relative movement between the parts. The annulus 10 has an inner peripheral surface 10a spaced radially from an outer peripheral surface 14b of the plate 14. The surface 14b is provided with a single tooth 17, which projects outwardly by a distance less than half of the spacing between the surfaces 10a and 14b. Another tooth 18 is formed on the surface 10a of annulus 10 and projects inwardly, also by a distance less than half the spacing between the surfaces 10a and 14b. The surface 10a is undercut, and a ball 20 is trapped between the surfaces 10a and 14b. Any suitable trapping mechanism, other than the undercut of the surface 10a, may be employed. In place of the ball 20, there may be used a cylinder or any other object having a rollable contour. A sliding block may be used instead of a roller, if the increased friction is preferred.

In the position of the parts shown in FIG. 3, the ball 20 occupies the space between the teeth 17 and 18 and prevents rotation of the plate 14, and hence of disk 12, in a clockwise direction from the position shown in FIG. 3. The plate 14 and disk 12 are free to turn in a counterclockwise direction from the position shown. As the plate 14 turns counterclockwise, the ball 20 rolls along behind the tooth 17, but the ball travels only half as far as the tooth 17. The teeth 17 and 18 are dimensioned so that they can pass each other. Consequently, the plate 14 and disk 12 can rotate through almost two revolutions before the ball 20 reaches a position where it blocks further movement of the tooth 17 with respect to the tooth 18 in the counterclockwise direction. The total amount of angular movement is determined by the dimensions of the teeth 17 and 18 and the ball 20, at approximately 700°. Shorter limits of angular rotation can be established by other arrays of teeth and blocking members.

The column 2 is made in four sections 2a, 2b, 2c and 2d. Sections 2a and 2b are connected by a linkage collar 21, to lock those two sections together against relative rotation. The sections 2b and 2c are similarly locked together by a linkage collar 22. The stem 3 is a hollow tube which extends downwardly through the sections 2b, 2c and 2d and carries near its lower end a key 24. A connector tube 25 is located between the stem 3 and the column sections 2a, 2b, 2c and 2d. The connector tube 25 is provided with a slot 25a in which the key 24 travels. See FIGS. 4 and 5.

A height adjustment mechanism 22 is located between the sections 2c and 2d. The height adjustment mechanism 22 includes a column retainer sleeve 26 threaded onto the upper end of the connector tube 25. The retainer sleeve 26 has an outwardly projecting flange 26a which abuts the top of the section 2c, and an upwardly extending flange 26b which is threaded on its outer surface. A locking ring 27 encircles the flange 26b and is threadedly connected thereto. The upper end of the locking ring 27 is provided with an inwardly directed flange 27a. A pair of wedges 30 and 31 are trapped between the locking ring 27 and the stem 3. One of the wedges is preferably brass and the other nylon, although the materials are not critical. The locking ring 27 preferably has its outer surface knurled to facilitate rotation. The wedges 30 and 31 may be slotted, as shown.

The uppermost section 2d of the column 2 is threaded to the outside of the outwardly extending flange 26a on the column 26.

When it is desired to change the height of the lamp 6 above the supporting surface, the column section 2d is first unscrewed from the section 2c. The locking ring 27 may then be rotated sufficiently to release the pressure on the wedges 30 and 31 so that the stem 3 may be moved vertically to the desired new height. As soon as the new height is established, the locking ring 27 is tightened again, thereby tightening the stem 3 by means of the wedges 30 and 31 and holding it in the desired vertical position with respect to the column 2.

The wires supplying the lamp with electricity pass through the stem 3 and have a considerable amount of slack as shown at 32 in FIG. 4, to accommodate the vertical adjustment of the stem 3 with respect to the column 2. The lower end of the central vertical apertures in the column sections 2a, 2b and 2c communicates with a diagonally downwardly extending passage 33 in column section 2a and a communicating passage 36 in the disk 12. The passages 33 and 36 are lined with insulating material 34. The wire 32 passes outwardly through a grommet 35 of insulating material in the plate 14 and is connected with a conventional electrical plug 36 at its outer end.

I claim:

1. A support for an article, comprising:
   a. a free-standing base including an annulus (10) having a central vertical axis and adapted for support on an underlying surface and a disk (12) rotatable within the annulus about said axis;
   b. a column (2) mounted on the disk and having a vertical axis spaced from the vertical axis of the disk;
   c. an arm (3b,3c) extending from the column above the base to a locality spaced from the axis of the annulus on the opposite side thereof from the axis of the column;
   d. an article (5,6) supported on the arm at said locality, the torque due to the mass of the article and the arm about the center of the base being substantially equal and opposite to the torque due to the mass of the column about said center, so that the article and support are balanced against tilting.

2. A support as in claim 1, including:
   a. a flange (12a) extending outwardly from the top of the disk and overlying a portion of the annulus; and
   b. said column being fixed to the disk and extending outwardly beyond the flange and overlying the annulus.

3. A support as in claim 2, including a ball bearing (13) between the flange and the annulus.

4. A support for an article, comprising:
   a. a free-standing base including an annulus (10) having a central vertical axis and adapted for support on an underlying surface and a disk (12) rotatable within the annulus about said axis;
   b. a column (2) mounted on the disk and having a vertical axis spaced from the vertical axis of the disk;
   c. an arm (3b,3c) extending from the column above the base to a locality spaced from the axis of the annulus on the opposite side thereof from the axis of the column;
   d. an article (5,6) supported on the arm at said locality, the torque due to the mass of the article and the arm about the center of the base being substantially equal and opposite to the torque due to the mass of the column about said center, so that the article and support are balanced against tilting;
   e. a flange (12a) extending outwardly from the top of the disk and overlying a portion of the annulus;
   f. said column being fixed to the disk and extending outwardly beyond the flange and overlying the annulus; and
   g. a bearing plate (14) fixed on and extending from the bottom of the disk and under the annulus.

5. A support as in claim 4, including a ball bearing (16) between the plate and the bottom of the annulus.

6. A support as in claim 3, including means (17,18,20) limiting the rotation of the disk with respect to the annulus.

7. A support as in claim 6, in which:
   a. the outer periphery of the disk is spaced from the inner periphery of the annulus, said disk carrying a first tooth (17) projecting less than half way through the space between the disk and the annulus;
   b. the inner periphery of the annulus carries a second tooth (18) projecting less than half way between the disk and the annulus; and
   c. a member (20) retained in the space between the disk and the annulus and having a diameter large enough to limit the rotation of the disk with respect to the annulus by bridging the radial gap between the first and second teeth.

8. A support for an article, comprising:
   a. a free-standing base (1) having a central vertical axis and adapted to rest upon a supporting surface;
   b. a column (2) mounted on the base and having a vertical axis spaced from the vertical axis of the base;
   c. an arm (3b,3c) extending from the column above the base to a locality spaced from the axis of the base on the opposite side thereof from the axis of the column;
   d. an article (5,6) supported on the arm at said locality, the torque due to the mass of the article and the arm about the center of the base being substantially equal and opposite to the torque due to the mass of the column about said center, so that the article and support are balanced against tilting; and
   e. means (22) for adjusting the height of the article above the supporting surface, said height adjusting means including:
      1. a connector tube (25) within said column and having an inwardly open slot (25a);
      2. a stem (3) within the connector tube and carrying a key (24) to be received in said slot, said stem projecting above the column and supporting the arm;
      3. an annular retainer sleeve (26) threaded to the upper end of the connector tube on the outside thereof, said retainer sleeve having an outwardly extending horizontal flange engaging a recess in the column and a vertical flange extending upwardly along the stem;

4. a locking ring (27) threaded to the outer periphery of the vertical flange; and
5. wedge means (30,31) retained between the locking ring and the stem, said locking ring having an inwardly projecting flange (27a) at its upper end for engaging said wedge means to lock the retainer sleeve and connector tube against vertical movement with respect to the stem.

9. A support as in claim 8, in which:
a. said column comprises two separable sections, the abutting ends of said sections being contoured to define said recess in the column, the upper one of said sections being recessed to receive and cover the height adjustment means, and slidable on the stem to provide access to the height adjustment means.

10. A support as in claim 9, in which the lower end of said upper section is threadedly engageable with said retainer.

11. A limited rotation joint including:
a. relatively rotatable, inner and outer concentric members, said outer member having a portion of its inner periphery facing and spaced from a portion of the outer periphery of the inner member;
b. said outer member having a first tooth on said portion of its inner periphery and extending less than half of the distance between said members;
c. said inner member having a projecting tooth on said portion of its outer periphery and extending less than half the distance between said members; and
d. a blocking member captured in the space between said members and having a radial dimension large enough to limit the relative rotation of said members by bridging the radial gap between the first and second teeth.

12. A support for an article, comprising:
a. free-standing base including an annulus (10) having a central vertical axis and adapted for support on an underlying surface and a disk (12) rotatable within the annulus about said axis;
b. a column (2) fixedly mounted in a vertical position on the disk and having a vertical axis spaced from the vertical axis of the disk;
c. an arm (3b,3c) extending from the column above the base to a locality spaced from the axis of the annulus on the opposite side thereof from the axis of the column;
d. an article (5,6) supported on the arm at said locality, the torque about the center of the base due to the mass of the article and the arm being balanced by the torque about said center due to the mass of the column, so that the article and support are stable against tilting in any direction.

13. A support as in claim 12, including ball bearing means between the disk and the annulus to facilitate rotation of the disk.

14. A support as in claim 12, including a flange (12a) extending outwardly from the top of the disk and overlying the annulus, said column being fixed to the disk and the flange.

* * * * *

UNITED STATES PATENT AND TRADEMARK OFFICE
CERTIFICATE OF CORRECTION

PATENT NO. : 4,428,554
DATED : January 31, 1984
INVENTOR(S) : Cedric Hartman

It is certified that error appears in the above-identified patent and that said Letters Patent is hereby corrected as shown below:

Col. 3, line 40, (claim 1-b.), after "(2)" insert -- fixedly --; same line, after "mounted" insert -- in a vertical position --.

Signed and Sealed this

Tenth Day of July 1984

[SEAL]

Attest:

GERALD J. MOSSINGHOFF

Attesting Officer

Commissioner of Patents and Trademarks